(No Model.)
H. SIEBEN.
VALVE.
No. 557,902. Patented Apr. 7, 1896.
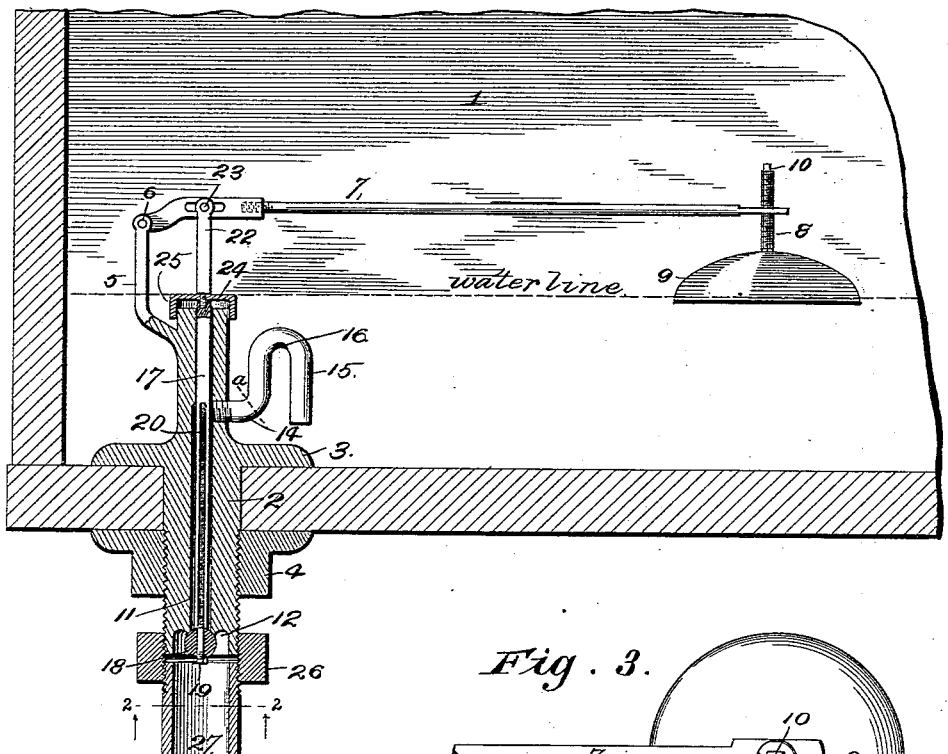
Fig. 1.
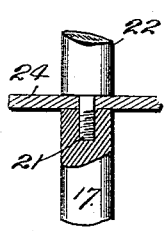
Fig. 3.
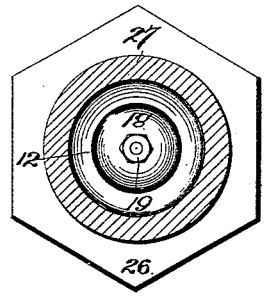
Fig. 2.
Fig. 4.
Fig. 5.
Witnesses:
S. G. Fischer
G. Y. Thorpe
Inventor
Henry Sieben,
By
Higdon & Higdon
Attys.

UNITED STATES PATENT OFFICE.

HENRY SIEBEN, OF KANSAS CITY, MISSOURI.

VALVE.

SPECIFICATION forming part of Letters Patent No. 557,902, dated April 7, 1896.

Application filed May 8, 1895. Serial No. 548,568. (No model.)

*To all whom it may concern:*

Be it known that I, HENRY SIEBEN, of Kansas City, Jackson county, Missouri, have invented certain new and useful Improvements in Valves, of which the following is a full, clear, and exact description, reference being had to the accompanying drawings, forming a part thereof.

My invention relates to valves for water tanks or boxes, and has for its object to produce a valve of this character wherein access may be had to the washer without necessitating access to the interior of the tank or box, whereby a backflow of water is prevented, whereby water is prevented from escaping through the top of the valve and injuring the ceiling of a room if the box be contiguous to the same without the use of washers, and wherein the float may be vertically adjusted to regulate the supply of water which the tank or box is to contain.

A further object of the invention is to provide a valve embodying the above-enumerated features which is simple, strong, durable, and inexpensive of construction.

With these objects in view the invention consists in certain novel and peculiar features of construction and combinations of parts, as will be hereinafter described and claimed.

In order that the invention may be fully understood, I will proceed to describe it with reference to the accompanying drawings, in which—

Figure 1 represents a vertical section of a tank or box and of a valve carried thereby which embodies my invention. Fig. 2 is a horizontal section, on an enlarged scale, taken on the line 2 2 of Fig. 1. Fig. 3 represents a top plan view, on an enlarged scale, of the float and a portion of the lever carrying the same. Fig. 4 represents a sectional view, on an enlarged scale, to illustrate more clearly the manner of securing the deflecting-cap in position. Fig. 5 is a side elevation of a portion of a valve of a slightly-modified form of construction.

In the said drawings, 1 designates a tank or box, and 2 designates the cylindrical valve-casing, said casing being arranged vertically in an opening in the tank or box and having an annular flange 3, which is clamped upon the bottom of the tank or box by means of the clamping-nut 4, which engages the externally-threaded portion 2 and bears at its upper side against the under side of the bottom of the tank or box, as shown clearly in Fig. 1. Projecting upwardly from and preferably cast integral with the valve-casing is the arm 5, and pivotally mounted in the upper end of the same, as shown at 6, is the lever 7, which may be formed of two pieces, as shown, or of a single piece of metal. This lever at its opposite end is provided with a threaded aperture, through which operatively extends the threaded stem 8 of the float 9. Said threaded stem at its upper end is preferably squared or flattened, as shown at 10, that the valve may be lowered or raised easily by engaging said squared or flattened portion with a pair of nippers or a wrench.

The casing 2 is longitudinally bored from end to end, as shown at 11, said bore from its lower end to a point above the plane of the bottom of the tank or box and of the flange 3 exceeding in diameter the remaining portion, for a purpose which will presently appear. The lower end of said casing is recessed, and the base of said recess is in the form of an annular groove, as shown at 12, to form a projecting valve-seat at the lower end of said bore. At the junction of said wide and narrow portions of the bore 11 a threaded pipe 14 communicates, and communicating in turn with said pipe, being preferably in the form of an inverted U, is the pipe 15, which has its lower end contiguous to the bottom of the tank, and at its bent or upper end is provided with an aperture 16, which is submerged or not, accordingly as the flush-water is in or has been drawn out of the tank. The object of this construction will be hereinafter explained. Extending longitudinally through said bore or channel is a valve-stem 17, and secured upon the lower end of the same to alternately open and close the valve-seat hereinbefore referred to, by means of a threaded stem and a clamping-nut 19 engaging the same, is a spherical, or approximately spherical, valve 18. Said stem 17, from its lower end to the pipe 14, is preferably grooved, as shown at 20, to afford as much space as possible for the supply-water to pass through. A continuation 22 of the valve-stem 17 is connected thereto by means of the threaded stem 21, which engages a threaded aperture in the upper end of the stem 17, while the upper end of said continuation 22 is pivotally connected, as at 23, in the longitudinal slot of the float-lever 7.

To prevent any of the water which passes up through the bore or channel 11 from escaping up through the top of the valve and possibly injuring the ceiling of the room, I provide a deflecting-cap 24, which is clamped firmly between the upper end of the stem 17 and the lower end of its extension 22, said cap being provided with a small central aperture through which the threaded stem projects. Said cap 24 is also provided with a depending annular flange 25, which will prevent the water from splashing out at the sides. The lower end of the body portion 2 is connected by a coupling-nut 26 to the supply-pipe 27.

Supposing the tank to be supplied with the requisite quantity of water for flushing purposes, said quantity being represented by the dotted water-line, Fig. 1, it will be noticed that the siphon or inverted U-shaped pipe is entirely submerged; but it is to be understood that when the "flush-water" is drawn off the water-line will be transferred below the plane of the opening 16 in said pipe, but not below the lower open end of the same, and the valve will be unseated by a corresponding descent of the float. It will now be apparent that if for any reason the water-supply should be cut off the water from the tank or box would not escape back through the casing with the escape of the small quantity of water in the casing between the valve and the aperture 16, owing to the fact that said aperture, by permitting air to enter the pipe 15 above its lower end or the water-level, breaks the siphon, which the escaping water from the valve tends to create, or, in other words, prevents the formation of a siphon, which would soon empty the tank or box until the water-level reached the undesirably low plane of the lower open end of the U-shaped pipe 15, as will be readily understood. In case the supply has not been cut off the water passes up through the pipe 27 and the enlarged portion of the bore 11 and the groove of the stem 17 to the pipe 14, through which and the pipe 15 it also passes, and continues to flow until the valve is again raised to the position shown and the required amount of water for the tank or box is obtained. As soon as the float reaches this height it automatically, acting with the pressure, causes the valve 18 to resume its seat and cut off the supply of water.

Referring now to Fig. 5, it will be seen that I dispense with the U-shaped pipe 15 by employing a pipe 14 with a beveled outer end, said beveled outer end being obtained, if desired, by cutting on the line *a*, Fig. 1, the pipe at the junction of the pipes 14 and 15, and the outer end of said pipe 14 is provided with a pivoted gravity or drop valve 29, which is pivoted at its upper end, as shown at 28, at the upper side and outer end of the pipe 14. When the water is entering the tank or box by way of the pipe provided with this gravity or drop valve 29, the same will be forced upwardly by water-pressure, as shown in dotted lines, Fig. 5. Immediately, however, the supply of water is cut off by the valve 18 resuming its seat the pressure of water in the tank or box, together with the natural tendency of the valve, causes it to move down to the position shown in full lines and close the pipe 14 to prevent the accidental escape or backflow of the water in case it becomes necessary to remove the washer 18 for any reason.

From the foregoing it will be apparent that I have produced a valve structure which possesses great advantages in point of simplicity and durability over any at present in use to my knowledge. One of these great advantages lies in the fact that the valve or element which controls the supply-water may be removed at any time desired without necessitating access to the interior of the tank or box or requiring that the water supply therein should be entirely drawn off. It is also evident that this construction is of practical advantage over the old, from the fact that the ordinary valves must be reached by way of the interior of the tanks or boxes, which, being located usually near the ceiling, are awkward to get at. The employment of a cap 24, clamped in position as described, will also be noticed as a decided advance in the art in point of cheapness and durability, and also in point of effectiveness, because, as well known, the washers usually employed wear out sooner or later and the water splashing up through them is liable to injure the ceiling or the paper thereon before it is known that they are loose or worn out. The caps I employ will not permit the water to get out and will last as long as the valve-casing. It will also be noted that by having the discharge end or opening of the pipe 15 contiguous to the bottom of the tank the roaring sound and splashing that usually accompany the entrance of water into the tank are reduced to the minimum.

From the above description it will be apparent that I have produced a valve which is positive and reliable in operation and which is simple, strong, durable, and inexpensive of construction.

It is to be understood, of course, that changes in the arrangement and detail construction of parts may be resorted to without departing from the essential spirit and scope or sacrificing any of the advantages of my invention.

Having thus described my invention, what I claim as new, and desire to secure by Letters Patent, is—

The combination with a tank or box, of a valve-casing, projecting through the box and provided with a longitudinal bore or channel and with a discharge-pipe, a supply-pipe connected to the lower end of the same, a stem extending through said bore or channel, consisting of two sections, one having a valve at its lower end which alternately affords and cuts off communication between the bore or channel and the supply-pipe, and at its upper end a threaded cavity, and the other having a threaded stem engaging said threaded cavity, a cap interposed between the upper end of the lower portion of the stem and the lower end of the upper portion of the stem, and provided with a central aperture through which the threaded stem of the upper portion projects, and with an annular flange, which embraces the upper end of the casing, a lever fulcrumed at one end upon an arm of the casing and pivotally connected near said end to the upper end of said stem, and a float carried at the opposite end of said lever, substantially as set forth.

In testimony whereof I affix my signature in presence of two witnesses.

HENRY SIEBEN.

Witnesses:
S. B. FALOR,
G. Y. THORPE.